US006580356B1

United States Patent
Alt et al.

(10) Patent No.: US 6,580,356 B1
(45) Date of Patent: Jun. 17, 2003

(54) ADVANCED PERSONAL IDENTIFICATION SYSTEMS AND TECHNIQUES

(76) Inventors: Eckhard Alt, Eichendorffstrasse 52, 85521 Ottobrunn (DE); Juergen Jaekel, 51 Valley Rd., Atherton, CA (US) 94027

( * ) Notice: Subject to any disclaimer, the term of this patent is extended or adjusted under 35 U.S.C. 154(b) by 0 days.

(21) Appl. No.: 09/186,577

(22) Filed: Nov. 5, 1998

(51) Int. Cl.$^7$ ............................................. G05B 19/00
(52) U.S. Cl. ..................... 340/5.8; 340/5.7; 340/573.1; 340/10.41; 340/10.6; 340/5.61; 340/5.81; 342/357.07; 342/42; 342/44; 342/51; 713/182
(58) Field of Search ..................... 340/5.8, 5.7, 573.1, 340/10.41, 10.6, 5.61, 5.81; 342/357.07, 51, 42, 44; 713/182

(56) References Cited

U.S. PATENT DOCUMENTS

| | | | | |
|---|---|---|---|---|
| 5,204,672 A | * | 4/1993 | Brooks .................. 340/825.71 |
| 5,523,746 A | * | 6/1996 | Gallagher .................. 340/5.61 |
| 5,530,438 A | * | 6/1996 | Bickham et al. ............. 340/5.8 |
| 5,652,570 A | * | 7/1997 | Lepkofker ............... 340/573.4 |
| 5,682,032 A | * | 10/1997 | Philipp ....................... 235/422 |
| 5,742,233 A | * | 4/1998 | Hoffman et al. .......... 340/573.1 |
| 5,769,011 A | * | 6/1998 | Daniel ........................... 109/7 |
| 5,796,827 A | * | 8/1998 | Coppersmith et al. ...... 713/182 |
| 5,811,897 A | * | 9/1998 | Spaude et al. .............. 307/149 |
| 5,929,769 A | * | 7/1999 | Garnault ..................... 340/5.61 |
| 6,211,799 B1 | * | 4/2001 | Post et al. ..................... 341/33 |

* cited by examiner

Primary Examiner—Michael Horabik
Assistant Examiner—Yves Dalencourt

(57) ABSTRACT

A method for identifying a person authorized to enter into a secured transaction, including implementing a security system to receive a coded signal that purports to identify as an authorized person the wearer of a device generating the coded signal through a transmission link constituting the body of the wearer, upon physical contact between an input terminal of the security system and the body of the wearer. After purported identification of the wearer as an authorized person for the transaction, data stored in a memory of the device is delivered to assist in processing the transaction by access through the security system. Data stemming from the transaction is retrieved for updating data stored in the memory, usable in a subsequent transaction by the wearer. When a higher level of security is required for entry into the transaction, a predetermined physical characteristic of the wearer is scanned at the time the received coded signal purports to identify the wearer as an authorized person; and the scanned physical characteristic is then compared with a stored representation of the physical characteristic of the actual person identified by the coded signal to evaluate if a match exists. A personal identifier for a security system is also disclosed.

12 Claims, 2 Drawing Sheets

ADVANCED PERSONAL IDENTIFICATION SYSTEMS AND TECHNIQUES

BACKGROUND OF THE INVENTION

The present invention relates generally to systems and techniques for accurately and reliably identifying a specific individual to enable a secure transaction to be conducted by or with the individual. More particularly, the invention relates to improved systems and techniques for uniquely identifying an individual for secure access to the individual's personal information or to the sensitive information of an organization or thing with which a transaction is to be conducted by or with the individual.

Rapid advancement of computer technology has led to smaller devices, capable of storing and manipulating increasingly greater amounts of data, at faster speeds. Computer and computer network advances likewise have led to their increased usage in conducting transactions between individuals and organizations or institutions, from banking to credit and debit purchasing to personal data transfer and so forth. Transactions may be conducted by an individual directly with a specific organization by dial-in to the particular organization's computer network phone number where available, or by use of a more general computer network such as the Internet, where huge numbers of worldwide web (www) pages are available to enable individual call-up and communications, including transactions, to take place via computer modem and Internet access provider facilities. Other transactions may be conducted on a more personal basis, such as by insertion of an identification card (e.g., a so-called "smart card" containing one or more integrated circuit chips) to make purchases or to gain access and entry to a facility, or by entering a preselected personal identification number (PIN), or by simply pressing a button. To provide and maintain appropriate security in completing the transaction, it may be essential for the system to assess and verify the identity of the individual seeking entry or access, which may necessitate the use of sophisticated fingerprint or ophthalmic (e.g., iris) identification techniques.

Clearly, in some instances neither the individual nor the organization or other entity or thing involved in a transaction is concerned about matters of security of information sought or obtained in the course of the transaction. For example, airlines desire to make information regarding flight schedules, airport terminals and air fares between cities readily available to actual and potential customers over the Internet through a specific web site, and the individual customer is generally fully prepared to furnish name, address and telephone/facsimile (fax) number information through that medium to enable receipt of communications from the airline. As another example, each driver of a vehicle may be able to pre-program his or her seat adjustment preferences so that by simply pushing a button an automatic readjustment is made to one's personal preferences after the car has been driven by another driver, and neither any driver nor the vehicle itself "cares" that anyone can select any of the pre-programmed settings. In many instances, however, it is desirable to be considerably more discreet, and indeed, to practice great security in supplying or allowing access to sensitive information in pursuit of or in the course of a transaction.

The term "transaction" is generally used throughout this patent application in the broad sense of a communicative action or activity involving two parties or things, or a party and a thing, that reciprocally affect or influence each other, or that unilaterally affects or influences the other. Thus, a transaction may be a prelude for an individual to gain entry (i.e., be permitted access) to a secure area, such as that within a company or a governmental agency, or an airport security gate, for example, or the carrying out of a transfer of money such as the withdrawal of cash from an automated teller machine (ATM) or the payment of a bill by debiting one's bank account, or the delivery of sensitive information such as personal information of the user or confidential business information of an organization, or the reliable identification of a particular patient in a hospital without resort to the wearing of an identification bracelet, to cite a few examples without limitation.

Beyond merely limiting access to computer data and networks, security control is a major issue in all aspects of an organization's research and development and know-how information, and in the sensitive personal property of individuals. While security checks that involve the use of identification cards that carry embedded integrated circuit chips or magnetically coded information are quite common, higher levels of security require more sophisticated personal identification techniques which are highly personal to the individual, such as the aforementioned fingerprint or handprint or iris comparison and matching techniques, to identify authorized users. And as noted above, personal identification may also be used to transmit or automate certain personal preferences or settings in the everyday use of appliances or machinery such as television and stereo channel or band or related selections, computer and software settings and selections, telephone settings, automobile settings such as remote entry and seat adjustments, remote garage door opening commands, and so forth.

In some instances, the need to provide the information required for access or entry, whether by placing a finger on a sensing mechanism, or by entering a PIN number or a card number, or by inserting a smart card into a slot, is viewed by the user as an annoyance or an imposition despite a recognition that security may be important if not essential. If the user has forgotten a PIN number among a multitude of PIN numbers used for various institutions, access will be denied. On the other hand, use of a single PIN number for a multitude of potential transactions, or keeping a record of PIN number(s) in one's wallet or purse, can allow penetration and carrying out of otherwise secure transactions by an unauthorized person who has obtained access to that information by theft, including computer hacking.

It would clearly be desirable to provide advanced systems and techniques for personal identification which are installed and operated reliably, quickly, efficiently, inexpensively, safely, and with relative simplicity, and which are less intrusive or physically interactive, in comparison to presently used and heretofore proposed personal identification systems and techniques. Certainly, the capability of a security system to distinguish one individual from another and to recognize or identify a specific individual without the need for complex hardware and/or software is a worthy goal.

It is a principal aim of the present invention to provide such advanced systems and techniques for personal identification in situations where virtually any level of security may be required or desired, but where the highest levels of security may require an additional system or method of verifying the identity of the individual seeking entry into or access to a transaction.

SUMMARY OF THE INVENTION

The present invention is directed toward a personal identification system which utilizes electrical characteristics or properties of the human body to enable transmission of encoded electrical or electronic signals to identify and recognize the individual or a code selected by the individual, for security purposes. The body transmission system is sometimes referred to herein as the "body link."

In broad terms, the present invention resides in a personal identifier for a security system, in which the identifier includes a coded signal generating device adapted to be carried on the body of a person identified thereby, and which utilizes the body of the person carrying the device as a transmission link for the coded signal generated thereby, to interact with an identity recognition system. The body utilization is achieved by coupling the coded signal to the electrical conductivity (or impedance) circuit of the user's body. The invention may alternatively be viewed in the broad context of a personal identifier for authorizing secure transactions, in which a personal identification generator is adapted to be worn in direct physical and electrical contact with the body of the wearer, to interact by touch of the wearer with an identity recognition system, and in which a personal identification signal of the generator is communicated to the recognition system through a transmission link provided by the body's electrical conductivity.

More particularly, according to the invention a system of personal identification selectively and automatically enables a specified operation or transaction to be performed according to preset instructions, by means of a transmitter adapted to be worn on the body of a person. The transmitter is implemented to transmit an electrical signal that uniquely identifies its origin for reception by a recognition system adapted to perform the specified operation upon recognition of said origin as an authorized mandate. Means are provided for maintaining the transmitter in close physical and electrical contact with the body of the wearer so that the body acts as a transmission link for the signal. The latter means is preferably an article commonly worn on the body, such as a wristwatch or other article of jewelry, suitable for housing the transmitter. A wristwatch is most preferred because the transmitter is battery powered, and a wristwatch typically employs a battery which may be used to power the transmitter. Other commonly worn articles that may be fashioned to incorporate the transmitter include a finger ring, a bracelet, a necklace, a pendant, or an amulet, which are cited by way of example and not of limitation.

Alternatively, the means for maintaining the transmitter in close physical and electrical contact with the body of the wearer may conveniently be an article which serves as an aid to one of the human senses of the wearer, such as a pair of eyeglasses, and more specifically the metal frame of the eyeglasses, or a metal surface of a hearing aid. Still another alternative is to incorporate the transmitter into a hermetically sealed metal case adapted to be implanted in the body of the wearer.

The transmitter is adapted to allow selective encoding, preferably digital encoding, of the signal to provide the unique identification of origin. To conserve battery energy, means may be provided for automatically activating and deactivating the transmitter rather than allowing it to operate continuously. For example, a detector may be used to sense when the body of the wearer is positioned to provide a transmission link to the recognition system, e.g., when the wearer touches an electrical contact with his finger, which inputs the signal to the recognition system. In a preferred embodiment, a predetermined minimum change in electrical impedance of the transmission link is produced by the touching, which indicates the establishment of an electrical connection to the recognition system, and the sensing of at least this change initiates activation of the transmitter. Similarly, a predetermined minimum change in electrical impedance of the transmission link after activation may be sensed as indicative of termination of the electrical connection to the recognition system, and used to initiate deactivation of the transmitter. Alternatively, the transmitter may be deactivated automatically upon passage of a predetermined time interval following activation of the transmitter, i.e., when a timer which is part of the transmitter circuit times out.

To provide a microminiature transmitter and related circuitry, it is preferably implemented in integrated circuit form by the use of conventional semiconductor processing and fabrication techniques. This enables the device to be produced in a size that is readily fitted within even a relatively small article of jewelry such as a finger ring, which can also accommodate the battery, and which further assures that a metal surface of the article that conducts the transmitted signal is in close physical and electrical contact with the wearer's body.

In a method according to the invention for automatically performing a transaction upon recognition of the identity of a user as being authorized to enter into the transaction, an electrical signal transmission unit is provided to be worn on the body of the user by incorporating said signal transmission unit into a wearable article that makes firm electrical and physical contact of the signal transmission unit with the body, so that a signal generated by the signal transmission unit will be broadcast throughout the body via a communication link created by the natural electrical conductivity of the body. The generated signal is encoded, preferably digitally, in a manner to identify a selected unique descriptor of the user. An identity recognition system related to the transaction to be performed is provided for interacting with the signal transmission unit, and has an electrical contact surface through which the encoded generated signal is inputted to the identity recognition system when touched by the user's body (e.g., a finger) while wearing the article. This allows the selected unique descriptor to be evaluated by the identity recognition system to verify authorization for the transaction to be performed.

In the method, the signal generator is activated only upon each new touching of the electrical contact surface of the identity recognition system by the user's body, and is deactivated after the encoded generated signal has been evaluated.

The transaction to be performed may be any of various commonly encountered types in which some level of security is desired or required. The security requirement may be of a minimum level which is satisfied by merely assuring that the transmitter wearer is initiating the transaction with the identity recognition system. That is, it may be sufficient that an encoded signal alone which is among those that can be recognized is detected by the recognition system, which will occur if the electrical contact for the recognition system is touched by the transmitter wearer, to initiate the transaction or operation that has been programmed into a related unit. At a considerably higher level of security, it may be necessary or desirable to engage in a further verification (i.e., beyond the detection of a recognizable encoded signal) that the wearer is indeed the person (or among a class of persons) authorized to initiate the transaction sought to be performed.

An example of the types of transactions which may be initiated and performed upon recognition of a personal ID, which may be as simple as a PIN number selected by the user or as complex as a numerical sequence that is preprogrammed as the code carried by the signal to describe a particular characteristic or feature of the user or of completely arbitrary format, include allowing access to a restricted area containing sensitive information for selective retrieval therefrom. Other examples are the allowing of access to a computer and to a software program therein; or the selection of a pre-programmed routine constituting a personal preference of the identified user; or the selection of a program preference of the identified user from among the programs available on a broadcast entertainment set; or the selection of at least one among a plurality of electro-mechanical settings constituting personal preferences of the identified user in a vehicle; or the keyless unlocking or opening of a door (a vehicle door, a front door of a house, a garage door, etc.); or the identification of the identified user as a patient in a health care facility such as a hospital, clinic, surgical center, treatment center, rehabilitation center or doctor's office, to verify scheduling of procedures designated to be carried out on or for the identified user, and to enable retrieval of personal data from computer records for the identified user.

In the method of the invention, each new touching of the electrical contact surface which is part of the identity recognition system by the wearer initiates a mutual exchange of information between the signal transmission unit and the identity recognition system. For example, this may begin as a "handshake" procedure which is indicative of the initial verification of the coded signal. As noted above, if the transaction involves a heightened level of security, the identity of the user may be subjected to additional scrutiny with a higher order identity recognition system. Nevertheless, an advantage of the present invention is that such additional verification can be performed concurrently with the step of evaluating the unique descriptor within the coded signal by a single comparison of the two, to eliminate a need for multiple comparisons of a series of physical characteristics of the user relative to a data base of such characteristics. Examples of conventional higher order identity recognition systems include fingerprint, iris or voice detection.

Accordingly, it is another broad aim of the invention to provide a system and method for allowing one to initiate and even complete a transaction automatically through the mere touching of a single electrical contact pad, which, by that medium alone, recognizes the entry of a code that personally identifies the user as being an authorized user, including one among a multiplicity of persons in a class of authorized users.

A more specific aim of the invention is to provide a wearable device that generates an encoded signal which is transmitted through the body itself as a communication link so that when the user touches a contact pad associated with an identity recognition system, the encoded signal is evaluated to initiate (or reject) a desired transaction.

BRIEF DESCRIPTION OF THE DRAWINGS

The above and still further aims, objects, features and attendant advantages of the present invention will become apparent from a consideration of the ensuing detailed description of the presently contemplated best mode of practicing the invention, by reference to a preferred embodiment and method, taken with accompanying Figures of drawing, in which.

DETAILED DESCRIPTION OF THE PREFERRED EMBODIMENTS AND METHOD

By way of some further background, the conductance of the human body is directly dependent upon the electrical resistivity (or conductivity) of the tissue, the fluids, and the various organs of the body. Blood, for example, is generally a very good conductor of electricity, with a typical specific impedance of about 50 ohms per centimeter ($\Omega$/cm). This specific impedance is modified by some factors within each individual, but the typical low impedance of blood is generally present within a broad range of individuals without modification attributable to race, age or sex. Body tissues exhibit a somewhat higher specific impedance, with muscle residing at about 400 $\Omega$/cm, and fatty tissue in a range of from about 400 to about 800 $\Omega$/cm, for example. The highest impedance in a specific portion of the body is present in the lungs when filled with air, at about 1000 $\Omega$/cm.

The specific impedance of the body and its parts is also dependent upon the type and frequency of the signal applied to measure (or otherwise be affected—such as conducted through the body—by or as a result of) this impedance, but the basic impedance values noted above are not modified to any significant extent by the frequency of the applied signal when in the range from about 1 to 100 kiloHertz (kHz).

Electrical signals may be transmitted through the body, affected in only a relatively minor manner by the body's specific impedance. The absolute value of the impedance or conductance of the body is not important so far as providing a means of identifying a specific individual is concerned, but only to enable the signal conduction to take place through the body. In that respect, the body acts as a link in the signal transmission process, and for that reason the system of the present invention is referred to, from time to time herein, as a body link security system.

Figure 1:
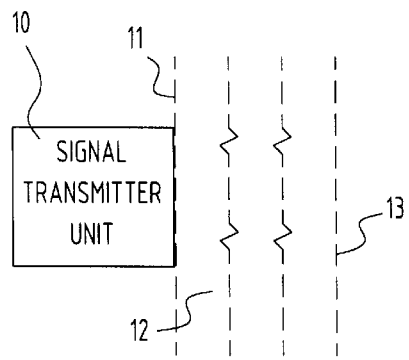
FIG. 1 is a simplified block diagram of a signal transmitter unit disposed in operating relation to the body of an individual according to the body link personal identification system of the invention.
Figure 2A:
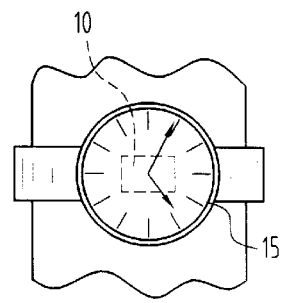
FIG. 2, parts 2A, 2B, 2C, 2D, 2E and 2F are fragmentary perspective views of various common jewelry articles that may be used to house the signal transmitter unit according to the principles of the invention.
Figure 2B:
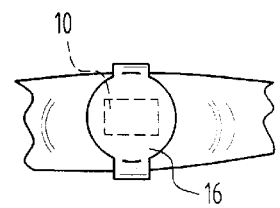
Figure 2C:
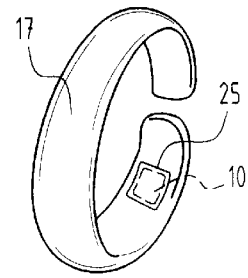
Figure 2D:
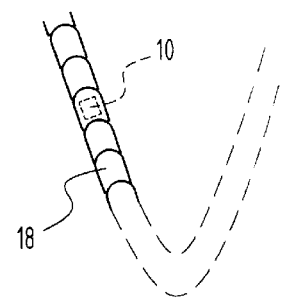
Figure 2E:
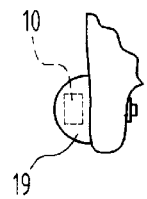
Figure 3A:
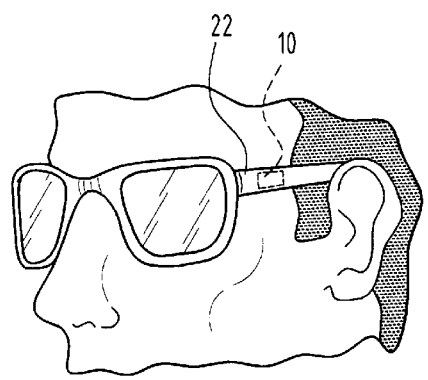
FIG. 3, parts 3A and 3B are fragmentary perspective views of two common articles employed to enhance human senses that may be used to house the signal transmitter unit according to the principles of the invention.
Figure 3B:
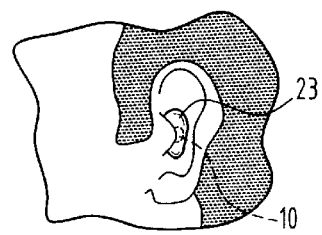
Figure 2F:
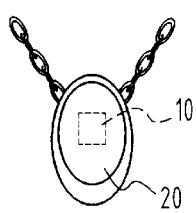
Figure 4:
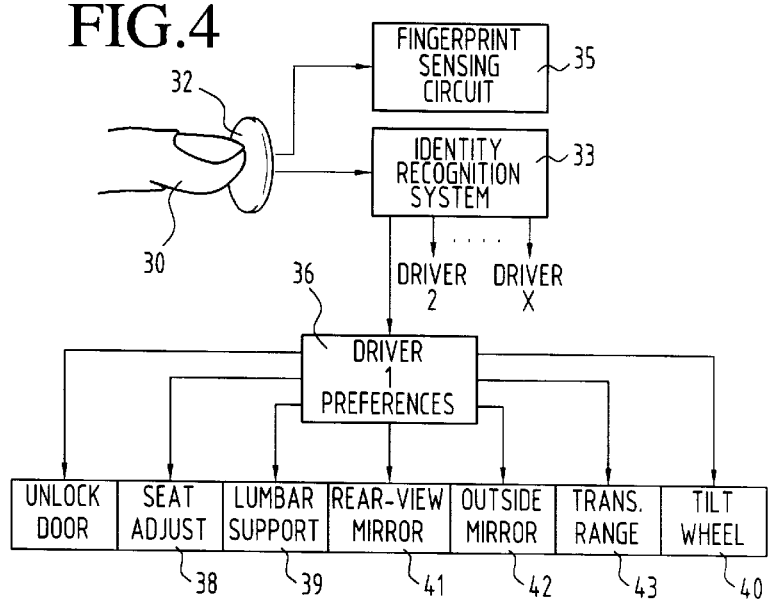
FIG. 4 is a simplified block diagram of a body link personal identification system used in conjunction with an identity recognition system to automatically select pre-programmed driver preferences in a vehicular application of the invention, and also illustrating the potential concurrent use of a higher level of security therewith.

For example, with reference to FIG. 1, if a signal transmitter unit 10 is placed in close (indeed, direct) mechanical and electrical contact with one side 11 of the body 12, the signal is conducted through the skin and the body itself and can be received at the other side 13 or any other external point of the body. This means that an ornament worn on the body and containing a battery powered transmitter, such as within a piece of jewelry in the form of a wristwatch 15 (FIG. 2A), finger ring 16 (FIG. 2B), bracelet 17 (FIG. 2D), necklace 18 (FIG. 2D), earring 19 (FIG. 2E), pendant or amulet 20 (FIG. 2F), or the like, or other item such as an eyeglasses frame 22 (FIG. 3A) or hearing aid housing 23 (FIG. 3B), can be used as part of a body conducted signal transmission system. In each case, the electrical signal is generated by the signal transmitter unit 10 which is incorporated within the housing provided by the respective article, ornament or item being worn, and is coupled to the skin of the wearer through an electrically conductive surface (such as 25, FIG. 2C) on the housing (in this example, bracelet 17). The electrically conductive surface to which the output signal of the transmitter is coupled, is selected to assure that when the article is being worn that surface will be firmly in contact with the skin of the wearer. A suitable conductive surface may comprise any low impedance material or substance, such as metal or electrically conductive carbon. The signal is transmitted through the skin, travels throughout the body and can be picked up at any external point on the body, such as at a fingertip 30 (FIG. 4).

By digitally or otherwise encoding the electrical signal, such as in a sequence of on-off pulses (to be described presently with respect to FIG. 6), the received signal may be used to verify the identity of the individual wearing the transmitter. For example, an individual could be allowed to gain keyless entry to his vehicle by simply touching an electrical contact pad 32 (FIG. 4) on the door handle that applies the conducted signal at the finger 30 of the wearer to an ID receiver (identity recognition system 33) within the vehicle. If the coding of the signal is detected to be correct, the receiver operates an unlocking mechanism to allow entry through the driver side door of the vehicle. A disadvantage, of course, is that if another person wears the item containing the transmitter, that person may impersonate the individual who is the usual or presumed wearer. Nevertheless, the security provided by this system is suitable in the most common low security transactions, in contrast to the high security transactions that may be encountered where greater assurances of precise personal identification are needed.

In the case of conventional remote keyless entry systems, for example, the transmitter which is typically a part of or attached to the conventional keyholder may be used by another person, with or without the owner's knowledge, so that the keyless entry embodiment of the present invention offers at least that same level of security. But the present invention has advantages in that the transmitter is worn directly on the person, rather than being carried in a pocket, wallet or purse and subject to a greater likelihood of being mislaid or lost. Perhaps more importantly, the present invention avoids the type of signal generally broadcast by remote keyless entry system transmitters, which is readily available to be picked up by a receiver carried by a car thief, for duplication to gain entry to and steal the unsuspecting owner/user's vehicle or its contents.

Moreover, the body link security system of the present invention requires no special overt act on the part of the wearer to accomplish the objective of entering into or completing a transaction, such as the unlocking of a door. There is no need to retrieve, point and activate a transmitter as in the conventional remote keyless entry system, for example. The wearer simply touches the electrical contact pad 32 on the door handle, or the door handle as a conductor in itself, which is part of the usual activity required to open the door. The door-opening application of the body link security, recognition or identification system of the present invention is not limited to vehicle entry systems, but may be used in substantially the same way to enable secure opening of the doors of a house, a business office, a safe, a safe deposit box, a refrigerator, a freezer, or any other facility, conveyance or container having a door.

Conventional fingerprint, iris or voice identification/comparison systems are used to identify a specific person, or at least to determine that the person on whom the comparison is being made is or is not part of the class of persons authorized to enter into or complete a particular transaction, by virtue of the permanence and uniqueness of the body parameter or function involved. Similarly, the body link system is most effective as a semi-permanent part of or adjunct to the individual. Thus, the transmitter is preferably permanently worn by the individual, on or in an object such as a ring or bracelet, i.e., where the object is either worn 24 hours a day, or each day invariably donned by the user soon after arising from the night's sleep and removed at the time of retiring for the night.

When such permanence of use is assured, it becomes highly unlikely that the individual will ever be without the body link personal identification system. Indeed, the only time the system would not be available is when the individual neglects to wear it (which is unlikely if the wearing of it becomes part of the daily custom or habit of the individual), or if it were involuntarily removed as might occur in the case where the individual becomes a victim of a robbery. This would not subject the system to less reliability than most conventional, types of identification systems which are currently in use. For example, as pointed out above, the typical remote keyless entry system is not better protected in the case of a robbery, and even without the individual being physically accosted in a robbery, the entry code supplied by such a conventional system may be stolen by means of the perpetrator's use of a special receiver fabricated for that purpose.

Additionally, the body link system may be custom-tailored, to an extent, to the particular individual by various techniques that take into account the specific impedance of the individual. For example, the signal strength of the received signal, which depends in part on the body's impedance and the state of charge of the battery(ies) that power the system, may be used as an additional factor in determining whether the designated user/wearer or an unauthorized individual is actually using the system. If the signal strength is outside a predetermined range bounded by preselected thresholds, access or entry may be denied, which would be a minor annoyance to the true wearer (who could use a traditional key or a PIN number, for example, to override the denial), but would be a preventive solution against a thief. Of course, this would not be effective if the body impedance of the designated wearer and an unauthorized wearer were approximately the same.

In any event, however, where a higher level of security is necessary or desirable for the nature of the access, entry or information sought by use of the body link system, an additional conventional identification system may be used, such as the more complex fingerprint or iris ID systems. A further advantage of the body link personal ID system over these more sophisticated systems, beyond complexity and cost considerations, is that the body link system avoids any need for performing a comparison of the sensed data obtained from current fingerprint or iris characteristics and data stored in a cache or other memory within the system. The comparison screening is a time consuming measure as well as requiring the availability of a data base suitable for enabling the comparison, possibly through hundreds or thousands of prints.

In contrast, the body link personal ID system provides direct information in coded form, with respect to the identity or other characteristic of the wearer. And if a higher level of security system is necessary, the only comparison required is to compare this direct information against the fingerprint information of the wearer. Although the vehicular adjustment system of FIG. 4 is not a likely candidate for concurrent use of a higher level ID security system with the body link system, such concurrent usage is shown for illustrative purposes only. Both of these pieces or sets of information are obtainable simultaneously, at the time the wearer places his fingertip 30 on the sensor pad 32. In the case of the strictly body link ID system, the detection is made using an electronic sensor which feeds the digitally encoded information to a detection circuit or identity recognition system 33. And in the case of the fingerprint (or iris) ID system 35 (FIG. 4), the necessary information is best obtained using an optical sensor (not shown, which may be incorporated in the same pad location 32). Thus, it is not necessary to perform a comparison of currently obtained information relative to a large historical data base. This simplifies the overall multi-system ID use and permits a speedy resolution of the identity of the wearer. In this illustration, the higher order identity system 35 is used to verify or confirm the identity of the person (or signal generator coded output) involved.

Numerous applications of the body fink personal ID system are possible, beyond the keyless entry application. Among these are the use of such a system to identify patients in a hospital. It is relatively rare, but statistically significant, that patient mixups occur which result in patients being subjected to improper or unnecessary surgeries or other procedures, or babies being mistaken for one another and brought to the wrong mother for feeding, and so forth. Currently, patient identification is typically provided by issuing a disposable bracelet in which a typed ID on a strip of paper is inserted into a transparent plastic tubular band which is then secured about the patient's wrist. Unfortunately, even double and triple checking procedures have not precluded mishaps in identification and incorrect identification with such a technique. Moreover, younger patients and mentally deficient or incapacitated patients can and all too often do tear the band from the wrist.

Also, under current typical practice, an application form containing the patient's personal data is filled out by the office or department in charge, such as a ward, for example. For expediting an examination or test such as x-rays, magnetic resonance imaging (MRI), computer aided tomography (CAT) scans, blood work, echocardiography, exercise ECG stress testing, or laboratory findings, and so forth, entries from the original application form may be required to be transcribed onto another reporting form to provide the necessary personal data of the patient. The body link system is not restricted to mere recognition of personal identity of the user, but may also include memory storage means such as semiconductore chip-fabricated read-only memory (ROM) or random access memory (RAM) which is loaded from time to time with other personal and historical data relating to the individual user. In the case of a patient, the previously obtained information stored in body link memory may be data pertaining to prior examination and test results, which is now available for retrieval at future medical sites.

Another aim of the present invention, then, is to use the body link personal ID system of the invention to facilitate logistical and procedural requirements applicable to medical center, hospital or clinic patients undergoing various tests and diagnostic procedures. With this system, a bracelet-housed transmitter coupled to or integrated with chip memory, for example, may be clamped to the patient's wrist in a way that prevents even accidental removal. By virtue of the security encoded signal that may be taken from the patient's fingertip (here, also, by having the patient or nurse apply the patient's fingertip to a receiver node such as a low resistance metallic pad electrical connection on the monitor screen or keyboard), and proper conventional computer programming, it is possible to bring up all of the patient's historical personal data relevant to the current hospitalization, including examinations, diagnoses, etc. This not only facilitates reliable patient identification while dispensing with human intervention of constant cross-checks and dispensing with the use of a temporary and removable disposable wristband of the conventional type, but also precludes a need to enter and re-enter patient data time and again by hand or to deliver the hospital chart with the patient each time a test, an examination, an evaluation, or a procedure must be performed on the patient. While reference is made here to hospital stays, the present invention may be used for patients who are being seen by a physician or physician's assistant and/or undergoing tests or examinations within a clinical or outpatient setting.

Accordingly, the body link system is readily usable not only as a personal ID system, but also to provide means for both temporary and permanent storage and transmission of personal information for use at various sites.

Additional applications of the body link system of the present invention are virtually endless. The system may be used to activate a preset menu of choices for the individual wearer on a home telephone set or a mobile or cellular phone, including automatic dialing (for example, in the case of a cardiac patient, to the patient's cardiologist); or to activate a menu on a radio, stereo or television or other broadcast entertainment set in a stationary facility or vehicular unit, including automatic selection of a particular or default radio or television station or stereo performance. Here, also, this is accomplished through a metallic pad connection on the set itself or on a remote control device which is enabled by the wearer simply touching the associated pad. A plethora of driver personal selections 36 such as seat position 38, lumbar support 39, tilt steering wheel height 40, rear view and side view mirror positions 41 and 42, respectively, climate control setting, radio station or stereo performance selection, firmness or softness of ride, 2- or 4-wheel drive (transmission range 40) and so forth, may be initiated simply by the wearer touching the door handle at the time of entry into his or her personal automobile. In the latter situation, the selections are not reset despite repeated exit and entry of the automobile by the same individual, but only when another wearer/driver uses the vehicle. On the latter occasions, when the new driver (driver 2, . . . , driver X) touches the pad 32, his or her pre-programmed preferences are automatically entered to produce the desired adjustments.

Simply touching a wall switch in an entry room of the wearer's home or office may be made sufficient through pre-programming to initiate the wearer's preferences regarding lighting, both artificial through interior lighting and natural through window treatment adjustment, activation of electrical appliances and electronic devices, and so forth. The same may be set for each wearer, with a reset occurring only when a different wearer/occupant touches the switch. An override to a dominant selection may be initiated, for example, by twice touching the switch in rapid succession, or by other coding means.

Turning on a computer, automatic selection of a particular software program, entry of one's personal password, and the like, may be accomplished by the wearer's act of simply touching an electrical contact on the device itself. Another wearer/user may activate his or her own set of computer preferences or selections in the same manner.

Figure 5:
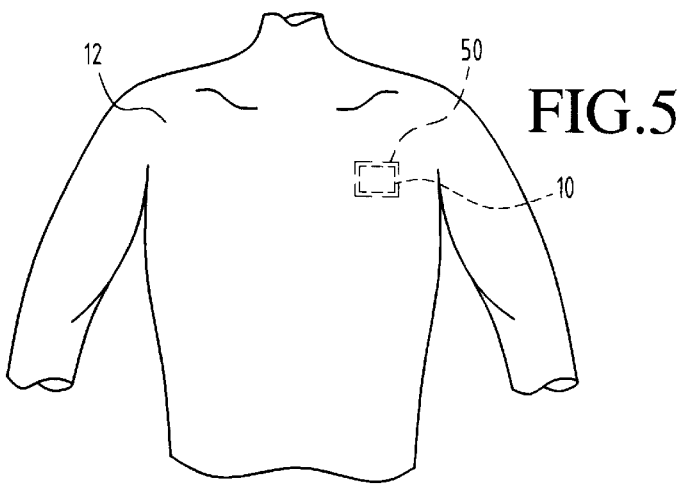
FIG. 5 is a fragmentary diagram of an individual with the signal transmitter unit of the body link personal ID system implanted in his body.

The common thread in each of these body link personal ID system applications is the recognition of an encoded signal supplied by a transmitter which is worn by an individual, sufficient to identify the individual as being authorized (or not) to initiate a particular instruction or set of instructions, and thereupon to implement (or to deny implementation of) the instruction(s). The act of wearing or being worn is used throughout this specification in the context of being carried by and in physical contact with the body of the individual. A battery powered device (i.e., a signal transmitter unit 10 which is physically implanted within a hermetically sealed case or housing 50 in the body 12 (FIG. 5) of the individual also falls within that context.

Access to a restricted area or to restricted information in a physical area or in a computer data base may be implemented by an authorized wearer/user by simply touching an electrical contact on a door or a device, to initiate a check of the body link personal identification/recognition system, with a virtually immediate approval or denial according to the pre-authorized level of security given to the wearer. Here, again, if the tightness of the security arrangement warrants, a dual hierarchical personal identification system may be utilized, such as in which the body link transmission provides a first level of recognition and the user's fingerprint data is used as a second higher level of recognition for verification. As noted above, such an arrangement has the clear advantage that it does not require a time-consuming search of and multiple comparisons with information stored in a data base, but only a single verification check of the two pieces of information which are obtained concurrently from the single act of touching a combined electrical-optical sensor contact. Of course, separate recognition systems may be used if desired, such as the body link system followed by an iris characteristic scanner or a voice recognition system.

Figure 6:
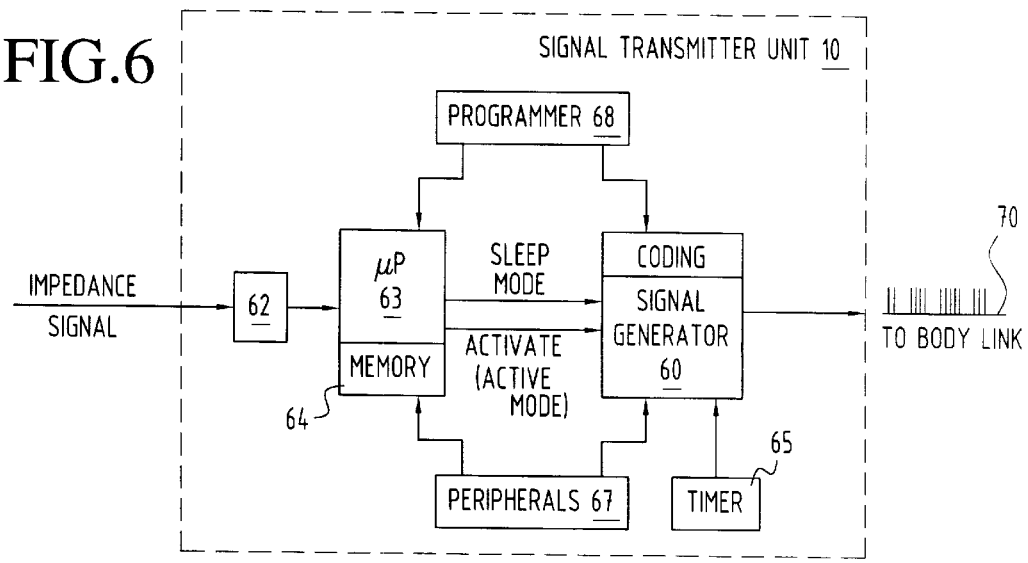
FIG. 6 is a simplified block diagram of the signal transmitter unit.

Referring now to FIG. 6, to avoid a need for continuous uninterrupted transmission of the coded signal by the transmitter worn by the wearer, the body link system may be and preferably is implemented to remain in a normal "off" (or "sleep") mode and to be turned "on" (or be "awakened") into an activated mode of coded signal transmission only as a result of a predetermined overt act of the wearer. Such an act, for example, may be the pressing of a specified button on the article containing the transmitter worn by the individual, to selectively turn the device on and off, as needed. However, this requires not only the button for that purpose, but also that the wearer must remember to activate and deactivate the system on each occasion it is to be used. Preferably, that decision-making process is taken out of the hands of the wearer, and instead made automatically by the body link system itself. To that end, the signal generator 60 of the transmitter 10 is triggered from the normal sleep mode to an awakened active mode by the wearer's act of merely touching the electronic sensor which is part of a receiver/recognition system in any facility, vehicle, appliance, device or unit implemented to utilize or respond to the body link personal ID system.

In a preferred embodiment, this is accomplished by triggering the active mode in response to the change in electrical impedance that occurs when the wearer's finger contacts the electrical or electronic sensor of the receiver system. An impedance detector 62 in the body link system 10 of the wearer senses this change in impedance and emits an activation signal which is applied to a microprocessor 63, for example, to turn on the transmitter, so that the coded electrical signal is coupled into the receiver portion of the system. In this way, the body link system and the respective receiving or recipient identification/recognition system engage in a mutual exchange of information. The microprocessor has an associated memory 64.

The body link system is implemented to return to the sleep state automatically. This is achieved, for example, either when the wearer removes his fingertip from the sensor contact pad or when a timer 65 in the transmitter device times out. Preferably, the break in contact is employed as the mechanism that causes the body link system to revert to the sleep state, because it avoids a need for an additional timer. It will be understood, however, that the transmitter device and all of its related and peripheral components 67 are readily fabricated in microminiature integrated circuit chip form by use of conventional semiconductor fabrication processing techniques. Such a chip is easily accommodated and housed within an unobtrusive article discreetly worn by the individual such as a jewelry item of one of the types mentioned above, and, in any event, the presence or absence of an additional component within the integrated circuit involves only a relatively slight add-on cost or saving.

Alternatively, the supply of power to the body link system may be controlled by means of a movement or activity sensor which can also be incorporated in or integrated with the circuitry of the system. For example, the activity sensor may be an accelerometer of the type disclosed in U.S. Pat. No. 5,014,700 to one of the inventors herein, and the '700 patent is incorporated by reference in its entirety herein. By use of such a sensor the battery power may be turned on or off according to whether the user is moving about or not. If the sensor detects no activity for a threshold time interval, the power is turned off or sleep mode initiated, and when the sensor again detects activity the power is turned on. In this way, the activity sensor controls the alert status of the body link system. Of course, the system may be needed to operate at times when the user is inactive, which makes the use of an activity sensor somewhat limited.

The automatic turning on and off of the transmitter (or of the power to the unit generally) is much more a consideration of battery depletion than any irritation or annoyance to the wearer or interference with other electrical communication systems from a continuously emitted electrical signal. The signal is of sufficiently low energy level and frequency to preclude physical harm or annoyance to the wearer, or to interfere with communications or other operating systems in the vicinity of the wearer. Battery lifetime, however, is a very practical consideration in assuring that the body link system will be activated whenever needed. Because the system is battery powered, it is most convenient, and preferred, that the system be implemented in conjunction with an article fashioned to be worn and which is also battery powered, such as a wristwatch (16, FIG. 2B). The back of the watch case is readily provided with a superior surface for excellent physical and electrically conductive contact with the wearer's wrist.

An alternative preferred embodiment is one in which the transmitter is housed in a tight-fitting bracelet (or anklet) such as 17 (FIG. 2C) or a finger ring 16 (FIG. 2B), simply because either of these is an article of jewelry which is quite likely to be permanently worn by the individual, including during nighttime sleep, and which is in constant contact with the wearer's skin. The desire is that the body link system be available at all times without a requirement of special attention or remembrance that it should be donned. However, the act of wearing a wristwatch during waking hours is so ingrained as a custom or habit of the typical individual that it has become second nature and virtually assures the presence and availability of the body link system when incorporated within the watch. Hence, considerations of avoidance of a need for battery replacement in a bracelet or ring makes the wristwatch implementation the embodiment of choice. Any of these physical embodiments may employ a solar-powered feature for the battery. Solar backup is especially effective in a ring setting because of its optimum exposure to light.

The output signal 70 of the signal generator 60 is encoded by pre-programming to carry the individual's (the wearer's) selected PIN number—which is typically composed of four digits—or any other personal identification descriptor. To that end, the programmer 68 of the device may be may be employed in programming and re-programming the code by use of an external programming console, utilizing telemetry and an antenna internal to the device, or the code may be preset at the factory. In the embodiment of FIG. 6, the encoded signal 70 is a pulse type signal in which the digits are composed of one or more pulses in a sequence or train, each digit being separated from the next by one or more spaces (i.e., time slots without pulses).

Although certain preferred embodiments and methods have been disclosed herein, it will be appreciated by those skilled in the art to which the invention pertains, from a consideration of the foregoing description, that variations and modifications may be made without departing from the spirit and scope of the invention. Accordingly, it is intended that the invention shall be limited only by the appended claims and the rules and principles of applicable law.

What is claimed is:

1. A personal identification system for automatically verifying a procedure to be performed on a patient in a health care facility based upon recognition of the identity of a user as the patient on whom the procedure is to be performed, comprising a signal transmission unit adapted to be carried by the user and including a signal generator for generating a signal encoded with a selected unique descriptor of the user; said signal transmission unit including a portion configured for interaction with the body of the user when carried by the user, whereby the natural electrical conductivity of the body will serve as a communication link for transmission of said encoded signal from said signal transmission unit to an identity recognition system of the health care facility when touched by the user to initiate reception of the encoded signal for evaluation of said selected unique descriptor by the identity recognition system to positively identify the user as the patient on whom said procedure is to be performed; and a memory in said signal transmission unit for storing data pertaining to the user to be automatically downloaded for verifying the accuracy of the procedure to be performed on the user by comparison of the downloaded data with records of the health care facility after the user is identified as the patient, said memory being adapted to store updated data reflecting said procedure to replace at least some of the data previously stored therein, to conform to updated records of the health care facility.

2. The system of claim 1, wherein said signal transmission unit is embodied in an article of jewelry.

3. The system of claim 2, wherein said article of jewelry is a wristwatch.

4. The system of claim 1, wherein said signal transmission unit is embodied in an article is an aid to one of the human senses of the wearer.

5. The system of claim 1, wherein said signal transmission unit is adapted to be implanted in the body of the wearer.

6. The system of claim 1, wherein said signal transmission unit includes means for automatically activating and deactivating the signal transmission unit.

7. The system of claim 6, wherein said means for automatically activating and deactivating said signal transmission unit includes an activity sensor for activation upon detection of movement of the user and for deactivation to a sleep mode upon detection of a lack of movement of the user over a threshold interval of time.

8. The system of claim 6, wherein said means for automatically activating and deactivating said signal transmission unit includes means for detecting when the body of the user is positioned to provide said transmission link for the signal to said recognition system.

9. The system of claim 8, wherein said detecting means includes means for sensing a predetermined change in electrical impedance of said communication link indicative of establishment of an electrical connection with respect to said recognition system, for initiating activation of said signal transmission unit.

10. The system of claim 8, wherein said detecting means includes means for sensing a predetermined change in electrical impedance of said communication link indicative of termination of an electrical connection with respect to said recognition system, for initiating deactivation of said signal transmission unit.

11. The system of claim 6, wherein said means for automatically activating and deactivating said signal transmission unit includes means for deactivating said signal transmission unit upon passage of a predetermined time interval following activation of said signal transmission unit.

12. A method for automatically verifying a procedure to be performed on a patient in a health care facility by recognizing the identity of a user as the patient on whom the procedure is to be performed, said method comprising the steps of providing an electrical signal transmission unit to be worn on the body of the user for generating a signal to be transmitted through a communication link created by the natural electrical conductivity of the body; encoding the generated signal so as to identify a selected unique descriptor of the user; providing an identity recognition system responsive to touching by the user to elicit reception of the encoded generated signal transmitted via the user's body for evaluation of said selected unique descriptor to positively identify the user as the patient on whom said procedure is to be performed, and, upon such identification, automatically downloading stored data from memory in the signal transmission unit to verify the accuracy of the procedure to be performed on the identified patient by comparison of the downloaded data with records of the health care facility; and thereafter loading updated data in connection with said procedure into said memory to replace at least some of the previously stored data therein to conform to updated records of the health care facility.

\* \* \* \* \*